United States Patent
Graf et al.

(10) Patent No.: US 10,882,261 B2
(45) Date of Patent: Jan. 5, 2021

(54) TAPE-LAYING DEVICE AND TAPE-LAYING METHOD FOR FLEXIBLY AND QUICKLY LAYING TAPES WITH DIFFERENT WIDTHS

(71) Applicant: DIEFFENBACHER GMBH MASCHINEN-UND ANLAGENBAU, Eppingen (DE)

(72) Inventors: Matthias Graf, Eppingen (DE); Felix Hellmeier, Eppingen (DE); Klaus Jung, Eppingen (DE)

(73) Assignee: DIEFFENBACHER GMBH MASCHINEN—UND ANLAGENBAU, Eppingen (DE)

( * ) Notice: Subject to any disclaimer, the term of this patent is extended or adjusted under 35 U.S.C. 154(b) by 76 days.

(21) Appl. No.: 16/342,186

(22) PCT Filed: Oct. 19, 2017

(86) PCT No.: PCT/EP2017/076743
§ 371 (c)(1),
(2) Date: Apr. 15, 2019

(87) PCT Pub. No.: WO2018/073359
PCT Pub. Date: Apr. 26, 2018

(65) Prior Publication Data
US 2019/0240929 A1    Aug. 8, 2019

(30) Foreign Application Priority Data
Oct. 19, 2016 (DE) .......... 10 2016 119 940

(51) Int. Cl.
*B32B 37/00* (2006.01)
*B29C 70/38* (2006.01)
(Continued)

(52) U.S. Cl.
CPC ............ *B29C 70/386* (2013.01); *B29C 31/08* (2013.01); *B29C 65/08* (2013.01); *B29C 65/787* (2013.01);
(Continued)

(58) Field of Classification Search
USPC ...................................... 156/580.1
See application file for complete search history.

(56) References Cited

U.S. PATENT DOCUMENTS

| 4,531,992 A | 7/1985 | Eaton |
| 6,131,901 A | 10/2000 | Hirohata |

(Continued)

FOREIGN PATENT DOCUMENTS

| DE | 19736424 A1 | 2/1999 |
| DE | 10 2007 012 608 A1 | 10/2008 |

(Continued)

OTHER PUBLICATIONS

U.S. Appl. No. 16/328,604, filed Feb. 26, 2019, Matthias Graf.
(Continued)

*Primary Examiner* — James D Sells
(74) *Attorney, Agent, or Firm* — Foley & Lardner LLP

(57) ABSTRACT

A tape-laying apparatus includes a material feeder configured to feed tapes, and a laying device configured for picking up and placing tapes onto a laying table. The laying device includes a transporter and a vacuum. The vacuum is connected to the transporter such that at least one tape is configured to be held on the transporter by a negative pressure generated by the vacuum. The transporter includes at least two endless transport belts, which circulate around deflection rollers. The transport belts run parallel to one another in a same transport plane.

20 Claims, 2 Drawing Sheets

(51) Int. Cl.
*B65H 5/22* (2006.01)
*B29C 31/08* (2006.01)
*B29C 65/08* (2006.01)
*B29C 65/78* (2006.01)
*B29C 65/00* (2006.01)
*B29C 70/54* (2006.01)
*B29K 101/12* (2006.01)
*B29K 307/04* (2006.01)

(52) U.S. Cl.
CPC ...... *B29C 66/72141* (2013.01); *B29C 70/545* (2013.01); *B65H 5/224* (2013.01); *B29C 2793/0081* (2013.01); *B29K 2101/12* (2013.01); *B29K 2307/04* (2013.01); *B65H 2404/251* (2013.01); *B65H 2404/264* (2013.01); *B65H 2406/3223* (2013.01)

(56) References Cited

U.S. PATENT DOCUMENTS

| | | | |
|---|---|---|---|
| 6,159,326 | A | 12/2000 | Shigeta et al. |
| 6,494,452 | B1 | 12/2002 | Karasiewicz |
| 6,793,217 | B2 * | 9/2004 | Gronbjerg ............ B65H 29/32 271/194 |
| 8,047,535 | B2 | 11/2011 | Nishimura et al. |
| 8,048,253 | B2 | 11/2011 | Cramer et al. |
| 2006/0137827 | A1 | 6/2006 | Uneyama et al. |
| 2010/0108252 | A1 | 5/2010 | Gessler et al. |
| 2011/0240213 | A1 | 10/2011 | Barlag et al. |
| 2013/0032287 | A1 | 2/2013 | Hagman et al. |
| 2014/0367031 | A1 | 12/2014 | Ufer et al. |

FOREIGN PATENT DOCUMENTS

| | | |
|---|---|---|
| DE | 10 2008 018 726 A1 | 10/2009 |
| DE | 10 2008 042 574 A1 | 4/2010 |
| DE | 10 2012 203 388 A1 | 9/2013 |
| DE | 10 2012 017 593 A1 | 3/2014 |
| DE | 10 2012 111 761 A1 | 6/2014 |
| DE | 10 2013 208 778 A1 | 11/2014 |
| EP | 0 128 826 A1 | 12/1984 |
| WO | WO-2008/110614 A1 | 9/2008 |
| WO | WO-2009/042225 A2 | 4/2009 |
| WO | WO-2012/156524 A1 | 11/2012 |
| WO | WO-2014/083196 A1 | 6/2014 |

OTHER PUBLICATIONS

Office Action issued in corresponding Chinese Application No. 201780065052.9 dated Mar. 2, 2020, with English translation.
International Search Report and Written Opinion issued in corresponding application No. PCT/EP2017/076743 dated Jan. 29, 2018.
PCT International Search Report (with English Language Translation) and Written Opinion (German Language only) in corresponding PCT/EP2017/072385 dated Dec. 14, 2017.

* cited by examiner

TAPE-LAYING DEVICE AND TAPE-LAYING METHOD FOR FLEXIBLY AND QUICKLY LAYING TAPES WITH DIFFERENT WIDTHS

CROSS REFERENCE TO RELATED APPLICATIONS

The present application is a U.S. National Stage of International Application No. PCT/EP2017/076743 filed on Oct. 19, 2017, which claims priority from DE 10 2016 119 940.0, filed on Oct. 19, 2016, the entire disclosures of which are incorporated herein by reference.

FIELD OF INVENTION

The present invention relates to a tape-laying apparatus and to a tape-laying method for building up a laminate, for example for motor vehicle components.

BACKGROUND INFORMATION

Applications for fibre composites have constantly increased over the past few decades, particularly when they could be seen as a low-cost alternative to metal materials, with the advantages of design freedom and application-specific formulation possibilities. Specifically, the material CFRP (Carbon Fibre-Reinforced Plastic) has an extremely lightweight construction and at the same time is characterized by its high strength and very high structural rigidity. The latter is an important criterion in automotive engineering for example.

The current development activities for production plants for processing fibre composites therefore range from solely developing machines to turnkey production systems. The former usually include preform production units, press units, and possibly injection units and post-processing units; the latter include the corresponding automation for preform handling, tool cleaning, component removal and the like.

Automatable production of the preform is a key technology in the process for producing continuous-fibre-reinforced fibre composite components so as to achieve efficient mass production with a reproducible stable quality of the component. However, even in the case of so-called hybrid components, that is to say compression-moulded metal sheets which are predominantly pressed using carbon fibre semifinished products to further reinforce critical load zones, all the production units must be able to be integrated in terms of plant and control technology if a sufficient level of productivity is to be achieved.

To produce continuous-fibre-reinforced components, use is nowadays predominantly made of textile fibre semifinished products such as fibre yarns and/or fabrics (so-called prepregs), such as fibre wovens, fibre knits, fibre nonwovens or fibre mats, which are wetted with a binder (hot-melt adhesive) and/or partially or completely impregnated with a matrix. The matrix of fibre-reinforced plastics has the task of embedding the heavy-duty fibres (supporting function) and completely filling the intermediate space therebetween (blocking function).

The binder materials and/or matrix materials used may in principle be materials from the groups of thermoplastics or thermosets and possibly additional elasticizing components, such as elastomers, which differ in terms of strength, maximum elongation, use temperature, processing speed and chemical resistance. Thermosetting moulding compounds can be plasticized under the effect of temperature, are malleable during this time, and then cure irreversibly under pressure and temperature. After processing, that is to say in the ready-to-use state, elastomers and thermosets, unlike thermoplastics, consist of more or less strongly crosslinked macromolecules, which are usually neither meltable nor soluble.

From these semifinished products, which are available as rolls or sheets in standard formats, blanks are produced in a cutting process, which blanks usually line the entire surface of the shaped component. When cutting the blanks, depending on the component geometry, significant cutting waste is generated which cannot be processed and significantly reduces the efficiency of this process.

To improve resource efficiency, continuous-fibre-reinforced components can be produced with substantially less waste or with no waste by means of methods which have become known as fibre-laying or tape-laying methods. Specifically, the use of tapes made of thermoplastic continuous fibres proves to be a very attractive process variant. In particular, the laying of the fibre composite, which is usually in the form of a tape, in order to build up a laminate is a particular challenge.

In the context of the present invention, a "tape" preferably means any type of web-like material, in particular a prepreg material, which has for example a width of between 30 and 200 mm and which is suitable for laying by means of a tape-laying apparatus. Here, "prepreg material" means in particular fibre yarns (rovings), fibre wovens and/or fibre nonwovens which are wetted with a binder and/or are partially or completely impregnated, in particular pre-impregnated, with a matrix, for example a thermosetting matrix or thermoplastic matrix.

The "fibres" are in particular carbon fibres, but the term "fibres" also equally encompasses glass fibres or other fibres, in particular natural or man-made fibres.

The tape may be arranged on a carrier material, in particular a carrier film or a carrier paper, which detaches from the carrier material while the tape is being deposited to build the laminate, the carrier material being removed, for example wound up, by means of a suitable device of the tape-laying apparatus. Preferably, however, use can also be made of tapes which no longer require any carrier materials.

In order to process tapes, it is known to pull these from a reel or roll, cut them to length, and deposit them onto a laying table or onto a tape structure that has already been deposited onto the laying table. When a tape strip or tape is deposited, the latter is spot-connected to the underlying tape layer via a number of ultrasonic welding heads.

In order to process tapes and to carry out a tape-laying method, use is often made of automatic apparatuses which are able to deposit a tape in a structured fashion. So-called tape-laying apparatuses are known in particular, which in the present case is also to be understood for example as a so-called fibre placement apparatus.

One example of a tape-laying apparatus is known from document WO 2014/083196 A1, which describes a tape-laying apparatus configured with two laying head units. The laying head units are arranged in such a way that they are accessible to a single laying table. The laying head units are independent of one another and are each configured with a separate material feed unit, cutting device, gripping means with associated linear drive, guideways and strip attachment unit. In this configuration, a strip portion can be pulled to length, positioned in guideways, and attached in position by the first laying head unit to the part to be produced, while at the same time the next strip portion is being pulled to length and positioned in the guideways on the second laying head unit. Once the first strip portion has been attached by the first laying head unit, the laying table conveys the part to be produced to the second laying head unit, while the next strip portion is prepared and brought into position in order to be attached to the part to be produced.

U.S. Pat. No. 8,048,253 B2 also describes a tape-laying apparatus which has a laying head, wherein a tape strip material is fed to a cutting device which cuts a tape strip or a tape that is then placed by the laying head onto the working surface of a laying table. The tape strip material and the tape that has been cut are each guided in the laying head in guide rails which are arranged on both sides of the strip or tape, wherein the edges of the strip or tape are held in grooves which are provided in the guide rails. Said document also describes that a plurality of laying heads may be provided so that it becomes possible to lay a plurality of tapes or tape strips simultaneously.

In both of these known tape-laying apparatuses, there is the disadvantage that, since the tapes are guided and held only at the sides by the guide rails, the tape strip material to be processed must have a sufficiently high internal stiffness so that the tape strip material does not sag and fall out of the guide rails. This may represent an undesirable limitation with regard to the materials, thicknesses and/or widths that can be processed.

In addition, since the tapes are held only relatively loosely by the lateral guide rails, the cycle time cannot be increased at will. This is because, if the laying head is moved too rapidly while being lowered, and the tape accordingly has to be moved rapidly against the resistance of the ambient air, the risk of the tape "blowing" and falling out of the guide rails may increase significantly.

For the laying of large-area fibre wovens, document WO 2012/156524 A1 describes a method for transporting a fibre contour, which has been cut out of a flat fibre woven, in the course of producing fibre-reinforced plastic moulded parts. In said document, a fibre contour is cut out on a cutting table. A suction gripper then moves over the fibre contour and brings a transport plate into contact with the cut-out fibre contour. By means of suction devices arranged on the transport plate, the fibre contour is fixed to the transport plate and lifted from the cutting table. The suction devices operate according to the Bernoulli principle, wherein air currents of the suction devices that are generated by the compressed air supply are routed away from the separating cut of the fibre contour. The suction gripper is attached to a manipulator, such as an industrial robot. A comparable principle of a suction gripper which serves for picking up large-area fibre wovens and which is attached to an industrial robot is also known from document DE 10 2013 208 778 A1, which describes a suction gripper in the form of a rod system arrangement consisting of rods which are crossed at an angle and which can be displaced in a parallelogram-like manner. Suction grippers which use a Coanda effect are arranged on the lattice structure in a variably positionable manner.

Said two documents describe large suction grippers which are not suitable for use in a tape-laying apparatus as described for example in the abovementioned documents WO 2014/083196 A1 and U.S. Pat. No. 8,048,253 B2. This is due in particular to the fact that said large suction grippers, as end effectors on an industrial robot, cannot be moved at a sufficient speed to be able to satisfy current and future laying rate requirements even when laying narrow and very narrow tapes. There is also the problem that, with a rapid movement, a considerable power consumption and associated high operating costs are to be expected due to the large moving masses. In addition, it is not possible with the suction grippers to switch on a suction effect, and to switch it off again after a tape has been deposited, in a sufficiently quick and reliable manner to achieve a cycle time of, for example, one second or less. What is more, because of the size of suction grippers and industrial robots, a parallelization of the tape laying process by providing two, three, four or more laying units is not possible or is possible only to a limited extent and with a considerable design complexity and associated high plant costs.

SUMMARY

It is therefore an object of the invention to specify an improved tape-laying apparatus and an improved tape-laying method which overcomes the aforementioned disadvantages.

It is yet another object of the invention to specify an improved tape-laying apparatus and an improved tape-laying method which can be used flexibly and quickly for the efficient depositing of tape strip material of different widths.

It is yet another object of the invention to specify an improved tape-laying apparatus and an improved tape-laying method which enables a high degree of positional accuracy when depositing tapes.

It is yet another object of the invention to specify an improved tape-laying apparatus and an improved tape-laying method which can be used with low plant costs and operating costs.

As a first solution, a tape-laying apparatus is specified which comprises a material feed unit for feeding tapes, a laying device for picking up and placing tapes onto a laying table, wherein the laying device comprises a transport means and a vacuum device, the vacuum device is connected to the transport means such that at least one tape can be held on the transport means by way of the negative pressure generated by the vacuum device, wherein the transport means is formed by at least two endless transport belts which circulate around deflection rollers, wherein the transport belts run parallel to one another in the same transport plane.

The use of at least two endless transport belts which circulate around deflection rollers makes it possible to transport tapes of different width by means of the transport belts. There is no need to adjust the respective laying device to the tape width to be processed, since the tapes can be guided with a surface bearing against the transport belts. As a result of being transported on the transport belts, the tape can be transported without having to be mechanically touched, for example by a gripper or in the guide rails. If the transport means is formed by at least two transport belts, it is now possible to react to different tape widths in a targeted manner since the distance between the transport belts is variable for example. In addition, individual transport belts can also be switched on or switched off as required, so as to operate only as many transport belts as are necessary for transporting the individual tapes. The power consumption in particular can be improved as a result. The tape to be transported is touched by the transport belts only at a small area, which is nevertheless sufficient for reliable transporting of the tape but at the same time also enables the tape to be transported in a gentle manner and without changing the properties of the tape.

In one preferred embodiment, transport belts are guided over common or separate deflection rollers. Besides guiding and directing the transport belts, at least one deflection roller is driven in order to enable the transport belts to move. If all transport belts are guided around common deflection rollers, it can be ensured that they are always driven equally. In order to avoid any overlapping of the individual transport belts during the movement thereof, it would be advisable that a running of the individual transport belts on a common deflection roller is inhibited for example by a guide. In order to prevent the possibility of overlapping of the transport belts, each transport belt may be guided around its respective deflection rollers, which are assigned to it alone. A different actuation of the transport belts would thus also be conceivable, so that, depending on the width of the tapes, in each case only the transport belts that are necessary for transporting are operated. If a plurality of transport belts which do not run over the same deflection rollers are operated simultaneously, it would be advantageous to synchronize the drives of the transport belts.

One advantageous embodiment of the invention is characterized in that openings are arranged in the transport belts. Via the openings, air is sucked into the vacuum chamber so that a negative pressure occurs on the surface of the transport belts, which makes it possible for the tapes to be transported either lying down or in a hanging fashion.

Preferably, the opening area of the openings is from 10 to 100 $mm^2$, most preferably from 25 to 60 $mm^2$.

Preferably, the pressure difference between the vacuum device and the surrounding environment is less than 100 mbar, preferably less than 75 mbar, particularly preferably less than 50 mbar. The use of relatively large openings in the transport belt, as seen in relation to the width of the transport belt, and thus of a resulting large amount of air that has to be moved, in conjunction with a relatively small pressure difference, not only makes it possible for the tapes to be held on the laying device but also offers the advantage that even bent edges or twisted tapes are reliably sucked onto the laying device and held thereon.

Alternatively, it would also be possible to use a transport belt made of a woven, which on account of its structure naturally provides a permeability to a gaseous medium.

Preferably, the deflection rollers have nubs on the surface thereof that faces towards the transport belt. The transport belts run over the nubs, as a result of which the slip between the belt and the deflection roller is reduced in comparison to when one or more smooth deflection rollers are used. By reducing the slip between the preferably driven deflection roller and the transport belt or transport belts, the accuracy with which tapes are deposited onto the laying table is also improved at the same time.

In a further embodiment of the invention, it may be provided that the nubs on the deflection roller and the openings in the transport belts are configured such that the nubs engage in the openings. In particular, the spacings of the nubs on the deflection rollers match the spacings of the openings in the transport belts with regard to the effective diameter. By engaging in the openings of the transport belt or transport belts, a form-fitting connection is established between the transport belt and the preferably driven deflection roller, which extends both in the transverse direction and in the longitudinal direction of the transport belt. As a result, a laying accuracy of 0.1 mm or less can be achieved when depositing tapes onto the laying table. There is no longer any need to guide the transport belt laterally in guide rails or to guide the transport belt by means of a guide edge applied to the transport belt in order to keep the transport belt on a certain track. Particularly in the case of very thin transport belts, lateral guidance is moreover difficult to implement, since on the one hand the wear due to friction may be very great and on the other hand, if the guidance is too loose, the transport belts may flex.

Preferably, the nubs are of hemispherical shape. A semicircular design means that the nubs protrude beyond the transport belt when the latter is being guided in the deflection roller, and the transport belt is reliably guided along the effective diameter and cannot jump out of the guide. On the other hand, a hemispherical shape of the nubs also has the advantage that the openings of the transport belt is guided on the nubs even if the position of nubs and openings are not quite exactly matched to one another.

As an alternative to or in combination with the aforementioned embodiments, the transport belts are tensioned to the same length. The same length ensures that the transport belts always run identically and there is no offset between the transport belts, for example when a tape extends over a plurality of transport belts.

One advantageous embodiment provides that the transport belts are made of a metal or an alloy with a high rigidity, preferably steel.

In a further preferred embodiment of the invention, the vacuum device comprises a plurality of vacuum beams which are assigned to the individual transport belts. Preferably, the vacuum beams form a gap to one another, the width of which is preferably variable. Subdividing the vacuum device into a plurality of vacuum beams makes it possible to construct a modular system in which a separate vacuum beam is assigned to each transport belt. The individual vacuum beams may each have a separate device for generating a negative pressure or may be connected to a common device for generating a negative pressure, wherein the connection of the individual vacuum beams to the device for generating a negative pressure can be interrupted as required.

Preferably, further means are arranged in the gap between two vacuum beams. The means arranged in the gap between two vacuum beams may preferably be formed by attachment units for attaching tapes to an already deposited tape structure and or pressing means for pressing tapes onto the laying table or onto an already deposited tape structure and/or cutting means for cutting the tapes from the transport belts and/or heating means for heating the tape to be deposited or the already deposited tape structure. The further means should preferably be able to be raised and lowered, so that a tape hanging on the transport belts can be transported in a continuous and disruption-free manner. If necessary, the means can then be moved in the direction of the laying table or of the deposited tape(s) and can perform their respective task, for example connecting the tape that has just been deposited to an already deposited tape structure. In addition, the means can also be moved in the horizontal direction.

As a further solution, a tape-laying method is specified, which comprises the following method steps:
feeding tapes by means of a material feed unit; and picking up and placing tapes onto a laying table by means of a laying device which comprises a transport means and a vacuum device, wherein at least one tape is held on the transport means by way of the negative pressure generated by the vacuum device, and the transport means is formed by at least two endless transport belts which circulate around deflection rollers, wherein the transport belts run parallel to one another in the same transport plane.

One preferred embodiment is characterized in that the transport belts are guided over common or separate deflection rollers.

One advantageous embodiment is characterized in that the deflection rollers have nubs on the surface thereof that faces towards the transport belt, into which nubs the openings of the transport belts engage. A form-fitting connection is thus formed between the deflection roller and the transport belt, which enables an optimal drive and an optimal movement of the transport belt with high accuracy.

Preferably, the vacuum device comprises a plurality of vacuum beams which are assigned to the individual transport belts, wherein preferably the individual vacuum beams can be switched on and off depending on the width of the tapes to be transported. By switching individual vacuum beams on or off, the power consumption for transporting tapes can be optimized.

As an alternative or in combination, the further means in the intermediate space between two vacuum beams can be moved horizontally and/or vertically. The further means can thus be moved between the bars into a desired position, wherein, by moving said further means vertically, the transporting of the tape by the transport belts can always take place without interference.

The tape-laying apparatus as set forth above is designed for implementing a tape-laying method as set forth above; but can also be operated independently. In particular, the tape-laying method can likewise be carried out using a tape-laying apparatus as set forth above.

Further preferred embodiments are presented in the dependent claims. The invention will be described below with reference to the drawings and on the basis of exemplary embodiments.

DETAILED DESCRIPTION

Figure 1:
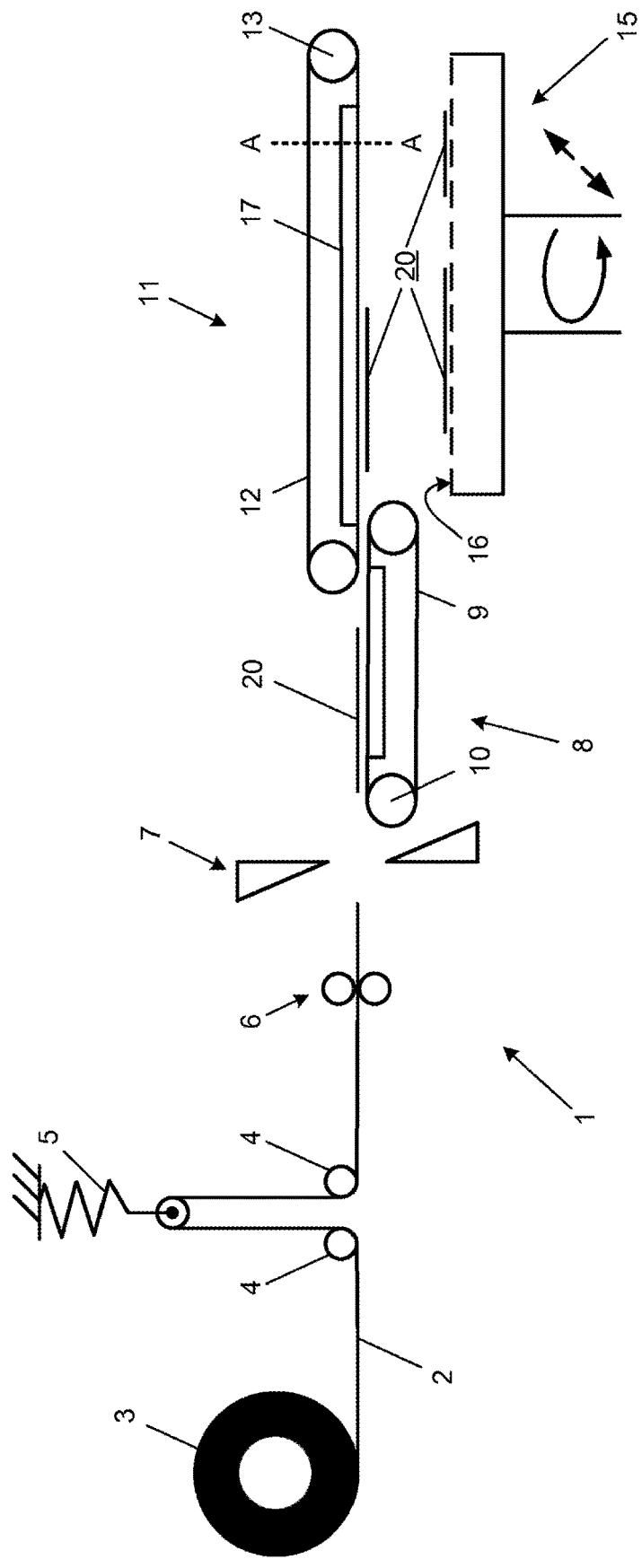
FIG. 1 shows a tape-laying apparatus.

FIG. 1 shows a tape-laying apparatus 1 for producing fibre-reinforced components and also reinforcing structures for fibre-reinforced components, in a schematic cross-sectional view. As shown in FIG. 1, in the tape-laying apparatus 1, a tape material 2, which is preferably provided as a tape strip material that is wound onto a reel 3 for example, is unwound from the reel 3 and fed to a feed device 8. For this purpose, a drive device 6 is arranged in front of the feed device 8, which drive device in this embodiment has a pair of drive rollers which form a roller drive, also known as a mangle drive, which transports the tape material 2. The drive rollers of the drive device 6 are driven by one or more motors (not shown) under the control of a control device (not shown), so that the tape material 2 is "pushed" and thus fed into the feed device 8 with a desired speed and/or a desired length.

Between the reel 3 and the drive device 6, the tape material 2 is guided over deflection rollers 4. For continuous operation of the tape-laying apparatus 1, it is necessary that a buffer system 5 which can hold a certain stock of tape material 2 is arranged in the material feed region. Thus, in situations in which, for example, it is necessary to change the reel 3, production can continue uninterrupted by using the tape material 2 that is present in the buffer system 5 until a new reel 3 has been inserted and the tape material 2 thereof has been threaded into the system. The buffer system 5 may be designed as a dancer system, which uses one or more spring systems to hold a stock of tape.

Thereafter, before or in the feed device 8, the tape material 2 is cut by means of a cutting device 7, which is configured for example as a cutting blade, in order to cut from the tape material 2 individual tapes 20 of a respectively desired length. For clean cutting, it is necessary that the feeding of tape material 2 to the feed device 8 is briefly stopped. To enable continuous unwinding of the reel 3 in spite of this, the buffer system 5 can also compensate for this brief slowing or stopping of the movement of the tape material 2. The cutting device 7 or the cutting blade is angle-adjustable, so that it is not only possible to make cuts transversely to the strip direction of the tape material 2, but also tapes 20 can be cut at a suitable desired angle by adjusting the cutting device 7 accordingly by an angle of, for example, ±45° relative to the transverse direction of the tape material 2.

As an alternative, it would also be conceivable that the tape material 2 are already fed into the feed device 8 as tapes 20 in the present case, and cutting to form tapes 20 at this point is no longer necessary.

Once the tapes 20 have been cut from the tape material 2 in the cutting device 7 and separated, or have already been fed in as individual tapes 20, the tapes 20 are transported further on the feed device 8, which ultimately feeds the tapes 20 to a laying device 11 and transfers them to the latter. In the present embodiment, both the feed device 8 and the laying device 11 are equipped with one or more transport belts 9, 12, 12a, 12b as transport means, said transport belts being guided around deflection rollers 10, 13, 13a, 13b. In the feed device 8, the tapes 20 are transported lying down, that is to say resting on the transport belt 9 on an upper side of the feed device 8. In contrast, the individual tapes 20 in the laying device 11 are each transported in a "hanging" fashion. To this end, the laying device 11 is provided with a vacuum device 17, which provides the negative pressure necessary for transport purposes, so that the tapes 20 can be sucked onto the underside of the laying device 11. It should be noted that the term vacuum is not used herein in the sense of an ideal, complete vacuum, which would mean a complete absence of air or other gases. Instead, the term vacuum is used herein in the sense of a negative pressure, which in particular is sufficiently pronounced to be able to reliably maintain a desired and/or required minimum holding force.

The vacuum device 17 is connected to the transport belt 12, 12a, 12b of the laying device 11 in such a way that air is sucked through the transport belt 12, 12a, 12b and thus a negative pressure can be built up, for example by providing a plurality of openings 14 in the transport belt 12, 12a, 12b, through which the air can be sucked. As an alternative, use can also be made of a transport belt 12, 12a, 12b which is made, for example, of a woven material, so that the meshes of the woven material form the openings 14 and a corresponding suction effect is formed, which is necessary for the suctioning of tapes 20.

The laying device 11 is arranged above a laying table 15. The laying table 15 comprises a table surface 16 having a plurality of openings which are operatively connected to a negative pressure device (not shown) so that air or other gaseous media can be sucked through the openings in order to generate a negative pressure. The laying table 15 or the table surface 16 can be divided into a plurality of negative pressure cassettes, which each comprise a plurality of openings. The individual negative pressure cassettes can be switched on and off as required and depending on the position for depositing tapes 20, in order thus to minimize the power consumption and to avoid unwanted air currents.

The laying table 15 and/or the laying device 11 can be moved relative to one another in the vertical direction, so that the laying device 11 can in each case place and deposit at least one individual tape 20 onto the laying table 15. By way of example, a linear guide (not shown) may be provided, by means of which the laying device 11 can be lowered in the vertical direction onto the laying table 15 in order to deposit the tape 20 onto the table surface 16 of the laying table 15, or onto a tape structure already formed beforehand on the table surface 16 of the laying table 15, and optionally to apply a brief and light pressure. After depositing the tape 20, the laying device 11 is raised again in order to pick up a next tape 20. It should be noted here that, in the context of this document, both the placement and depositing of one or more tapes 20 onto the table surface 16 of the laying table 15 and the depositing of one or more tapes 20 onto tapes 20 that have already been deposited onto the laying table 15 beforehand, in particular onto a previously formed tape layer, are to be understood as a placement and depositing of the tape 20 onto the laying table 15.

In order to increase the laying rate, it is provided in particular that a plurality of tapes 20 are handled simultaneously, that is to say in particular at the same time and in a plurality of lanes, wherein the number of tapes 20 laid per sequence is advantageously multiplied accordingly as a result of such a parallelization. Accordingly, it may be provided in a tape-laying apparatus 1 that the relevant units are provided in a corresponding multiple number. For instance, in each case two reels 3 may be provided, from which two strands of a tape material 2 are pulled by means of two drive devices 6 comprising a total of two pairs of drive rollers, said two strands being fed to two respective cutting devices 7, where two respective tapes 20 are cut by means of two cutting blades and are fed to two laying devices 11 by means of two feed devices 8. By means of the two laying devices 11, two tapes 20 can thus be placed and deposited onto the laying table 15 simultaneously.

It may also be provided that, as is known, while tapes 20 are being deposited, previously deposited tapes 20 are being attached to the underlying tape layer(s) for example by means of ultrasound devices or other attachment devices which are provided for this purpose, for example by plasticizing, or are being at least partially consolidated with the underlying tape layer(s) in order to form a laminate. This procedure can be repeated for each further tape layer. As an alternative or in addition, it is also possible to attach the tapes 20 to the underlying tape layer(s) immediately after they have been deposited and placed onto the laying table 15, for example by means of attachment devices, in particular ultrasound devices, which are provided in the laying devices 11. The first layer of tapes 20 which is deposited onto the laying table 15 is held on the table surface 16 of the latter by means of a negative pressure device (not shown) which are operatively connected to the openings on the table surface 16, the tapes 20 being sucked onto the table surface 16 of the laying table 15.

Figure 2:
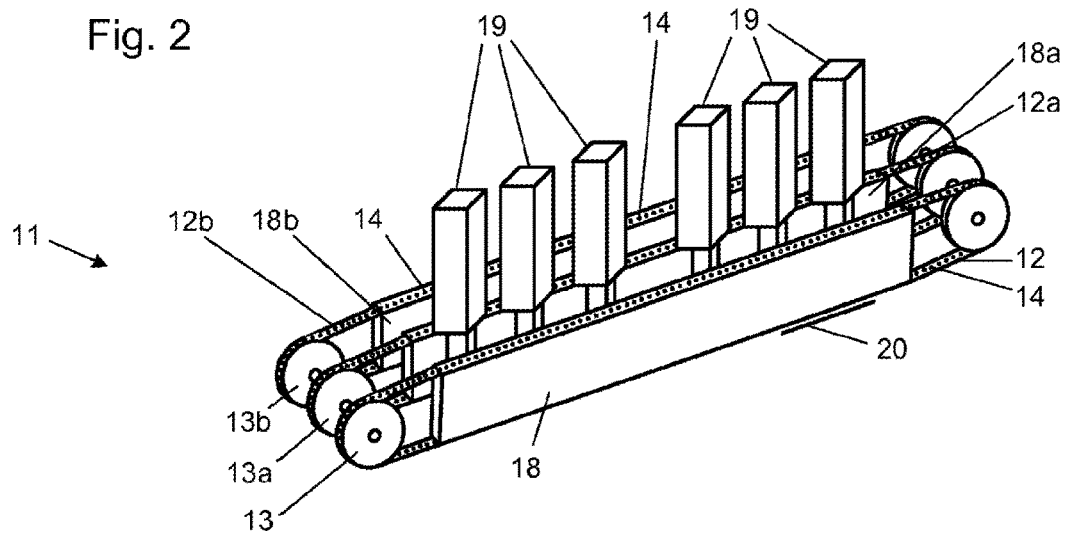
FIG. 2 shows, in a side view, a laying unit for laying tapes onto a laying table.

FIG. 2 shows, in a side view, the laying device 11 for laying tapes 20 onto a laying table 15. The laying device 11 comprises three transport belts 12, 12a, 12b, which are guided around deflection rollers 13, 13a, 13b assigned to each of the individual transport belts 12, 12a, 12b. By means of the transport belts 12, 12a, 12b, which have a width in a range from 1 to 5 cm, preferably in a range from 2 to 4 cm, particularly preferably of 2.5 cm, a tape 20 is transported in a "hanging" fashion on the underside of the laying device 11. In the present case, the vacuum device 17 is divided into individual vacuum beams 18, 18a, 18b, over which the individual transport belts 12, 12a, 12b are guided. Provided in the transport belts 12, 12a, 12b are openings 14, through which air can be sucked into the vacuum beams 18, 18a, 18b so that a corresponding suction effect can be achieved on the surface of the transport belts 12, 12a, 12b. The opening area of the openings 14 is selected to be relatively large in relation to the width of the transport belts and lies in a range from 10 to 100 mm$^2$, preferably in a range from 25 to 60 mm$^2$. As a result, a relatively large amount of air is sucked in, which in conjunction with a relatively small pressure difference between the surrounding environment and the negative pressure prevailing in the vacuum beam 18, 18a, 18b leads to the situation whereby the tapes 20 are not just held on the laying device 11 but are downright sucked onto the latter. In particular, bent edges of tapes 20 or twisted tapes 20 can thus be reliably transferred to the laying unit 11 and held thereon.

The openings 14 in the transport belts 12, 12a, 12b are arranged such that they can engage in nubs 30 arranged on the surface of the deflection rollers 13, 13a, 13b, so as to establish a form-fitting connection. The spacings of the nubs 30 on the deflection rollers 13, 13a, 13b are selected such that they match the spacings of the openings 14 in the transport belts 12, 12a, 12b with regard to the effective diameter. The spacing of the openings 14 lies in a range from 0.5 to 5 cm, preferably in a range from 1 to 4 cm, particularly preferably in a range from 2 to 3 cm.

A gap is formed between the transport belts 12, 12a, 12b and the vacuum beams 18, 18a, 18b, it being possible for further means 19, for example attachment units in the form of ultrasonic sonotrodes, to be arranged in said gap. When a tape 20 is deposited by the laying device 11 onto a tape structure that has already been deposited onto the laying table 15, one or more attachment units can be extended and can connect the deposited tape 20 to the already deposited tape structure and can fix it at the desired position. As the tape 20 is being fixed to an already laid tape structure, a further tape 20 can already be being transported into the laying device 11 by means of the transport belts 12, 12a, 12b.

The further means 19 may be, besides attachment units, for example in the form of ultrasonic sonotrodes, also pressing means for pressing deposited tapes 20 onto an already laid tape structure or onto the table surface 16 of the laying table 15 and/or also cutting means for cutting the tapes 20 from the transport belts 12, 12a, 12b and/or also heating means for heating and plasticizing tapes 20 to be deposited or the already deposited tape structure.

Figure 3:
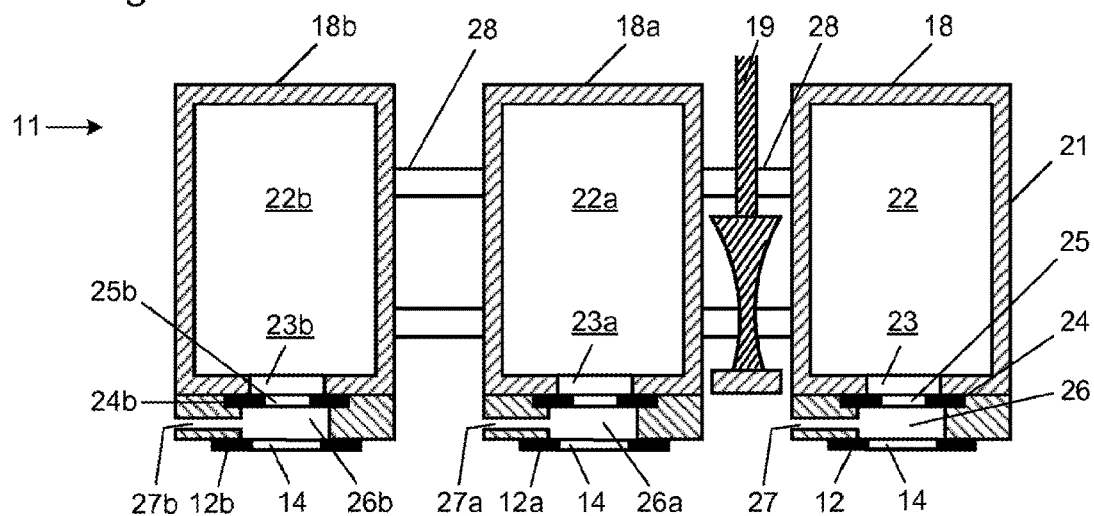
FIG. 3 shows a cross-section through a laying device of a tape-laying apparatus according to the invention, along the line A-A of FIG. 1.

FIG. 3 shows an embodiment of a laying device 11 in cross-section along the line A-A in FIG. 1. As shown in FIG. 3, the laying device 11 has a plurality of vacuum beams 18, 18a, 18b which are connected to one another via one or more connections 28. Each individual vacuum beam 18, 18a, 18b has a vacuum chamber 22, 22a, 22b which is bounded and defined by a wall 21, 21a, 21b. The vacuum chambers 22, 22a, 22b are connected to a vacuum pump (not shown), which preferably continuously sucks air out of the vacuum chambers 22, 22a, 22b so that a permanent vacuum prevails in the vacuum chambers 22, 22a, 22b. Via the connection 28, a fluid connection can also be formed between the vacuum chambers 22, 22a, 22b. It should be noted that the term vacuum is not used herein in the sense of an ideal, complete vacuum, which would mean a complete absence of air or other gases. Instead, the term vacuum is used herein in the sense of a negative pressure, which in particular is sufficiently pronounced to be able to reliably maintain a desired and/or required minimum holding force. The pressure difference between the surrounding environment and the pressure prevailing in the vacuum chambers 22, 22a, 22h is less than 100 mbar, preferably less than 75 mbar, particularly preferably less than 50 mbar.

As shown in FIG. 3, at least one opening 23, 23a, 23b is formed in the wall 21, 21a, 21h of the respective vacuum chamber 22, 22a, 22b, via which the vacuum chambers 22, 22a, 22b is connected to a further chamber which, for the sake of being easier to distinguish, will be referred to as the suction chamber 26, 26a, 26b. The suction chambers 26, 26a, 26h are each formed in a laterally arranged guide element as a closure element. Also provided is a slide bar 24, 24a, 24b which is arranged in the region of the at least one opening 23, 23a, 23b of the vacuum chamber 22, 22a, 22b between the wall 21, 21a, 21b and the guide element.

The slide bar 24, 24a, 24b is movable in a longitudinal direction, which is along the laying device 11 and vacuum device 17 in the direction of the transport direction.

The slide bar 24, 24a, 24b, which is movable in the longitudinal direction, is positioned such that through-openings 25, 25a, 25b provided in the slide bar 24, 24a, 24b are in each case aligned with the openings 23, 23a, 23b of the vacuum chambers 22, 22a. 22b and overlap said openings. In this position, the suction chamber 26, 26a, 26h is thus fluidically connected to the vacuum chamber 22, 22a, 22b, so that, on account of the vacuum prevailing in the vacuum chamber 22, 22a, 22b, a corresponding vacuum also exists in the suction chamber 26, 26a, 26b.

On the side of the guide element opposite to the vacuum chamber 22, 22a, 22h, the transport belt 12, 12a, 12b runs in abutment against the guide element and bounds the suction chamber 26, 26a, 26b on this side. A plurality of openings 14 are provided in the transport belt 12, 12a, 12b. On account of the negative pressure prevailing in the suction chamber 26, 26a, 26b, air is thus drawn through the openings 14 into the suction chambers 26, 26a, 26b. The air flowing into the suction chambers 26, 26a, 26b is sucked through the through-openings 25, 25a, 25b into the vacuum chambers 22, 22a, 22b and is sucked out of the latter by the vacuum pump (not shown). In this way, the air flowing in through the openings 14 on the transport belt 12, 12a, 12b generates a suction effect, by means of which one or more tapes 20 (not shown in FIG. 3) are sucked against the transport belts 12, 12a, 12b and held thereon, wherein at the same time the openings 14 of the transport belts 12, 12a, 12b are covered by the tapes 20 and thus are substantially closed.

In order to deposit the tapes 20, the slide bar 24, 24a, 24b is moved in the longitudinal direction so that the through-openings 25, 25a, 25h are no longer aligned with the openings 23, 23a, 23b. The slide bar 24, 24a, 24h thus interrupts the fluidic connection between the suction chamber 26, 26a, 26b and the vacuum chamber 22, 22a, 22b. In order to break down as quickly as possible the vacuum that still remains in the suction chamber 26, 26a, 26b or the negative pressure that still remains, it is preferably provided that a plurality of channels 27, 27a, 27b are formed in the guide element, which channels may be permanently open or can be closed by a closure mechanism in the active state when the openings 23, 23a, 23b are open towards the vacuum chamber 22, 22a, 22b. When the openings 23, 23a, 23b are closed, air then flows from outside through the channels 27, 27a, 27h into the suction chambers 26, 26a, 26b, so that the vacuum still prevailing therein or the negative pressure still remaining therein is rapidly broken down. A tape 20 (not shown in FIG. 3), which is still held against one of the transport belts 12, 12a, 12b, will therefore no longer be held against the transport belts 12, 12a, 12b due to the prevailing negative pressure in the suction chambers 26, 26a, 26b being broken down.

The construction of the laying device 11 with a modular system of transport belts 12, 12a, 12b, deflection rollers 13, 13a, 136 and vacuum beams 18, 18a, 18b offers advantages in particular when handling tapes 20 of different width. For example, if only very narrow tapes 20 are to be deposited onto a laying table 15 by the laying device 11, this can take place using the transport belt 12, which is driven and guided around the deflection rollers 13, and the vacuum beam 18. The further vacuum beams 18a, 18b can in this case be disconnected from the vacuum pump (not shown), so that the latter now has to pump only a much smaller volume. By shutting down the vacuum beams 18a, 18b, there is also no risk of these undesirably sucking already deposited tapes 20 from the table surface 16 while a tape 20 is being deposited by means of the first vacuum beam 18 and the associated transport belt 12. If medium or wide tapes 20 are to be used by the laying device 11, the individual vacuum beams 18a, 18b together with the associated transport belts 12a, 12b can be switched on in a modular fashion. Narrow and medium tapes 20 can be transported by any vacuum beam 18, 18a, 18b; the choice of vacuum beam 18, 18a, 18b and associated transport belt 12, 12a, 12h was only by way of example here. It would also be conceivable that a plurality of narrow tapes 20 can be transported and deposited by one laying device 11.

Figure 4:
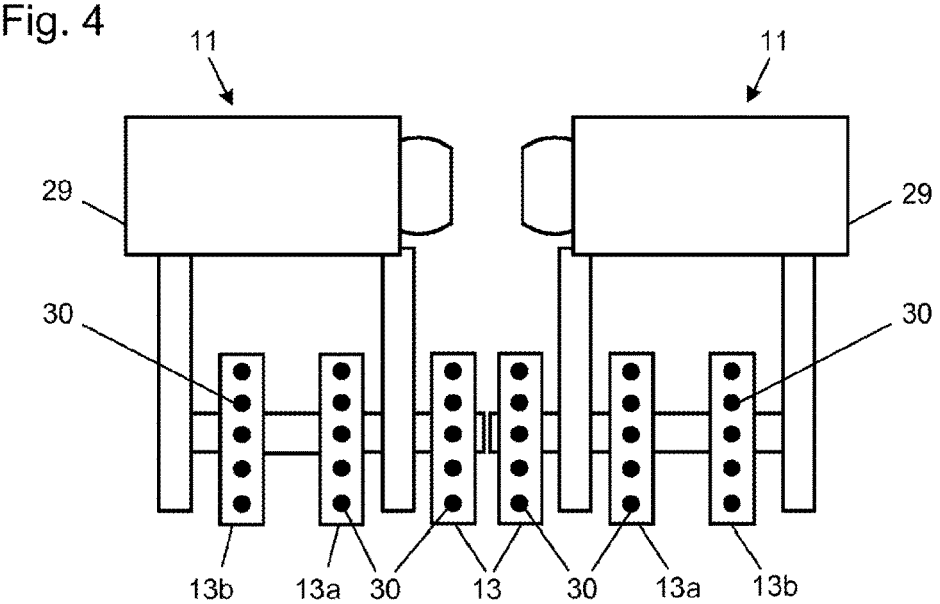
FIG. 4 shows the arrangement of two laying devices of a tape-laying apparatus.

FIG. 4 shows two laying devices 11 in a lateral plan view. The two laying devices 11 are configured as a mirror image of each other here. The deflection rollers 13, 13a, 13b are mounted on a common shaft 31 and are set in motion via a common drive (not shown). The nubs 30 are arranged in a regular pattern on the respective deflection rollers 13, 13a, 13h, said nubs preferably being of hemispherical shape. The respective openings 14 of the transport belts 12, 12a, 12b can engage in said nubs 30 and set the transport belts 12, 12a, 12b in motion. The common shaft 31 makes it possible to ensure that the respective deflection rollers 13, 13a, 13b rotate at the same speed and no offset occurs between the individual transport belts 12, 12a, 12b. The deflection rollers 13, 13a, 13b with the shaft 31 are connected via a common mount 29. For the optimal depositing of tapes 20 with a fast cycle time, it is advantageous if the tape-laying apparatus 1 has a plurality of laying devices 11. Preferably, the laying devices 11 are arranged as shown in FIG. 4, so that there is only a minimal distance between the two outer deflection rollers 13. To this end, the mount 29 for the deflection rollers 13, 13a, 13b is configured such that the outer deflection roller 13 is no longer covered by the mount 29, but rather is freely accessible. This minimal distance between the two laying devices 11 enables two tapes 20 to be placed onto a laying table 15 simultaneously and without a gap. However, the individual laying devices 11 can be moved individually, so that a larger distance between the two laying devices 11 can also be set.

LIST OF REFERENCE SIGNS P1533

1 tape-laying apparatus
2 tape material
3 reel
4 deflection roller
5 buffer system
6 drive device
7 cutting device
8 feed device
9 transport belt
10 deflection roller 11 laying device
12, 12a, 12b transport belt
13, 13a, 13b deflection roller
14 opening
15 laying table
16 table surface
17 vacuum device
18, 18a, 18b vacuum beam
19 means
20 tape
21, 21a, 21b wall
22, 22a, 22b vacuum chamber
23, 23a, 23b opening
24, 24a, 24b slide bar
25, 25a, 25b through-opening
26, 26a, 26b suction chamber
27, 27a, 27b channel
28 connection
29 mount
30 nubs
31 shaft

The invention claimed is:

1. A tape-laying apparatus, comprising:
a material feeder configured to feed tapes,
a laying device configured for picking up and placing tapes onto a laying table, wherein the laying device comprises a transporter and a vacuum,
wherein the vacuum is connected to the transporter such that at least one tape is configured to be held on the transporter by a negative pressure generated by the vacuum,
wherein the transporter comprises at least two endless transport belts which circulate around deflection rollers, and
wherein the transport belts run parallel to one another in a same transport plane.

2. The tape-laying apparatus according to claim 1, wherein the transport belts are guided over common or separate deflection rollers.

3. The tape-laying apparatus according to claim 1, wherein openings are arranged in the transport belts.

4. The tape-laying apparatus according to claim 3, wherein an opening area of the openings is from 10 to 100 mm².

5. The tape-laying apparatus according to claim 1, wherein the deflection rollers have nubs on surfaces thereof that face the transport belts.

6. The tape-laying apparatus according to claim 5, wherein the nubs on the deflection rollers and the openings in the transport belts are configured such that the nubs engage in the openings.

7. The tape-laying apparatus according to claim 5, wherein a spacing of the nubs on the deflection rollers match a spacing of the openings in the transport belts with regard to an effective diameter.

8. The tape-laying apparatus according to claim 5, wherein the nubs are of hemispherical shape.

9. The tape-laying apparatus according to claim 1, wherein the transport belts are tensioned to a same length.

10. The tape-laying apparatus according to claim 1, wherein the transport belts are made of a metal or an alloy with a high rigidity.

11. The tape-laying apparatus according to claim 1, wherein the vacuum comprises a plurality of vacuum beams which are assigned to individual transport belts.

12. The tape-laying apparatus according to claim 11, wherein adjacent vacuum beams are separated by a gap having a variable width.

13. The tape-laying apparatus according to claim 12, further comprising an ultrasonic sonotrode arranged in the gap between adjacent vacuum beams.

14. The tape-laying apparatus according to claim 12, further comprising at least one of an attachment unit configured for attaching tapes to an already deposited tape structure, a presser configured for pressing tapes onto the laying table or onto the already deposited tape structure, a cutter configured for cutting the tapes from the transport belts, or a heater configured for heating the tapes to be deposited or the already deposited tape structure.

15. A tape-laying method, which comprises
feeding tapes with a material feeder; and
picking up and placing tapes onto a laying table with a transporter and a vacuum,
wherein at least one tape is held on the transporter by a negative pressure generated by the vacuum,
wherein the transporter comprises at least two endless transport belts which circulate around deflection rollers, and
wherein the transport belts run parallel to one another in a same transport plane.

16. The tape-laying method according to claim 15, wherein the transport belts are guided over common or separate deflection rollers.

17. The tape-laying method according to claim 15, wherein openings are arranged in the transport belts.

18. The tape-laying method according to claim 17, wherein the deflection rollers have nubs on surfaces thereof that face the transport belts and engage with the openings of the transport belts engage.

19. The tape-laying method according to claim 15, wherein the vacuum comprises a plurality of vacuum beams which are assigned to individual transport belts, and wherein individual vacuum beams are configured to be switched on and off depending on a width of the tapes to be transported.

20. The tape-laying method according to claim 19, further comprising at least one of an ultrasonic sonotrode, an attachment unit configured for attaching tapes to an already deposited tape structure, a presser configured for pressing tapes onto the laying table or onto the already deposited tape structure, a cutter configured for cutting the tapes from the transport belts, or a heater configured for heating the tapes to be deposited or the already deposited tape structure,
wherein the at least one of the ultrasonic sonotrode, the attachment unit, the presser, the cutter, or the heater is provided in an intermediate space between adjacent vacuum beams and is configured to be moved horizontally and vertically.

* * * * *